United States Patent [19]
Mercier

[11] Patent Number: 5,490,362
[45] Date of Patent: Feb. 13, 1996

[54] HOLLOW BLOCK SYSTEM

[76] Inventor: Camille Mercier, C.H.L.G.R., Radisson, Baie-James, Québec, Canada, J0Y 2X0

[21] Appl. No.: 296,472

[22] Filed: Aug. 26, 1994

[30] Foreign Application Priority Data

Jun. 17, 1994 [CA] Canada .................................. 2126155

[51] Int. Cl.⁶ ...................................................... E04B 1/38
[52] U.S. Cl. ...................... 52/582.1; 52/582.2; 52/585.1; 52/586.1; 52/503; 52/309.1; 52/604; 446/111; 446/115; 446/127
[58] Field of Search ................................ 52/582.1, 585.1, 52/436, 503, 504, 309.1, 604, 582.2, 584.1, 586.1; 446/108, 111, 115, 127; 404/34, 40

[56] References Cited

U.S. PATENT DOCUMENTS

| | | |
|---|---|---|
| 2,392,552 | 1/1946 | Roe . |
| 2,594,378 | 4/1952 | Baldanza . |
| 3,235,920 | 2/1966 | Davis ........................................ 52/586.1 |
| 3,518,799 | 7/1970 | Bachner . |
| 3,555,757 | 1/1971 | Volent . |
| 3,798,861 | 3/1974 | Weiss . |
| 3,834,100 | 9/1974 | Healey . |
| 3,873,225 | 3/1975 | Jakobsen et al. ..................... 52/604 X |
| 3,882,218 | 5/1975 | Bixel . |
| 3,936,987 | 2/1976 | Calvin . |
| 4,241,554 | 12/1980 | Infantino . |
| 4,613,255 | 9/1986 | Bruer . |
| 5,038,542 | 8/1991 | Kline . |

FOREIGN PATENT DOCUMENTS

| | | | |
|---|---|---|---|
| 2659026 | 7/1978 | Germany ............................ 47/89 WB |
| 1272729 | 5/1972 | United Kingdom ..................... 52/586 |

Primary Examiner—Carl D. Friedman
Assistant Examiner—Christopher Todd Kent

[57] ABSTRACT

To create decorative border arrangements on the ground, a kit of blocks and interconnecting pieces is provided. To assemble the blocks end to end into a row, the opposite end faces of the blocks and the two opposite sides of the interconnecting pieces comprise respective mutually mating interconnecting elements extending transversely of the row and being slidable in each other upon transversal displacement of an interconnecting piece between the confronting end faces of a pair of consecutive blocks, thus fastening the two confronting end faces together. When desired, pickets are used to anchor the blocks to the ground to obtain a semi-permanent construction.

8 Claims, 7 Drawing Sheets

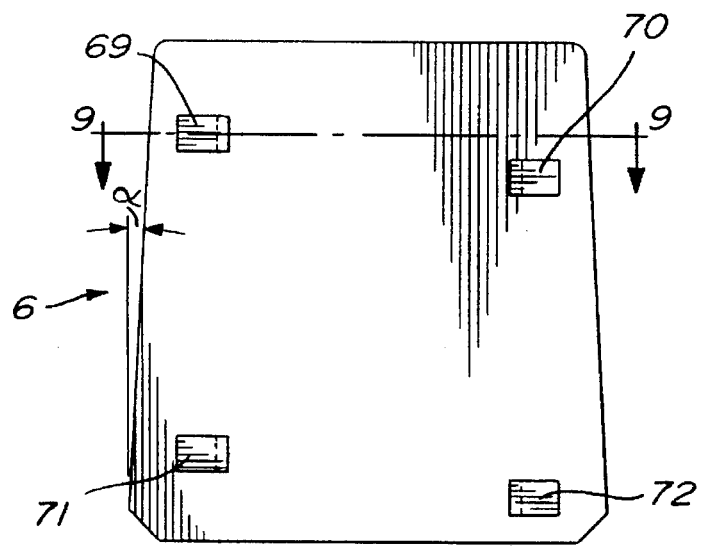
FIG. 8
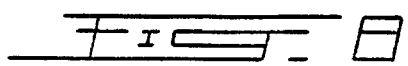
FIG. 9
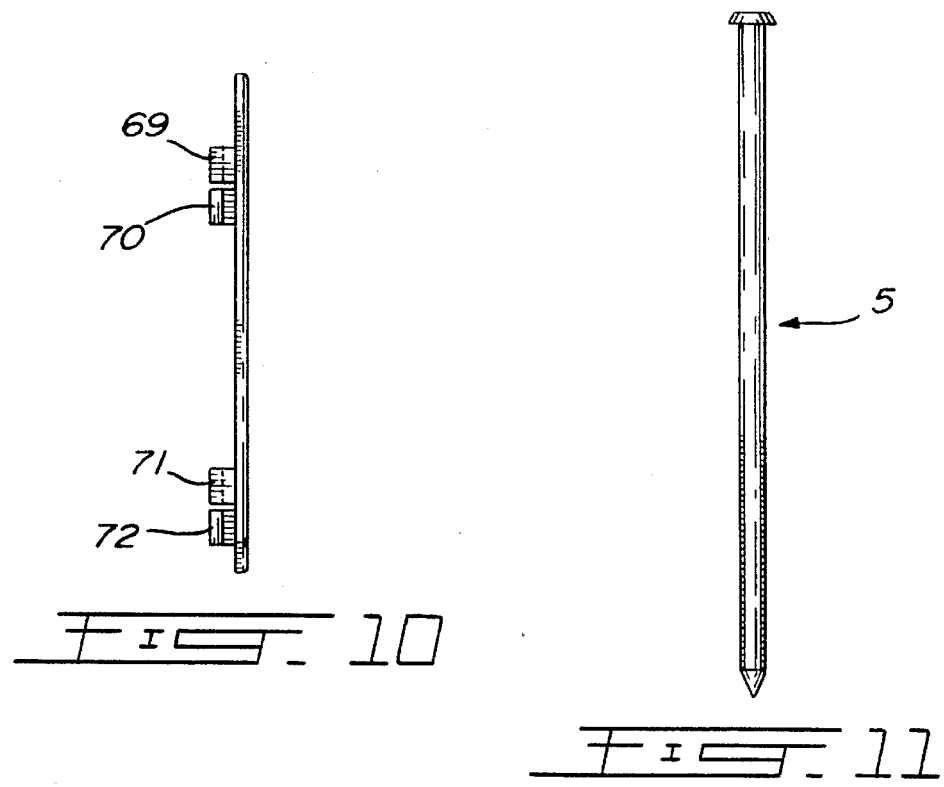
FIG. 10
FIG. 11

HOLLOW BLOCK SYSTEM

BACKGROUND OF THE INVENTION

1. Field of the Invention

The present invention relates to a kit of hollow blocks made of plastic material, and of interconnecting pieces for assembling these hollow blocks end to end into a row. More specifically, the present invention relates to a kit comprising different types of blocks that can be assembled end to end into rows in view of creating border arrangements of various configurations used in landscaping, for example to build ground decorations, or to delimit rock gardens, clumps of flowers, hedges, flower beds, etc.

2. Brief Description of the Prior Art

Hollow building blocks made of plastic material are widely known in the field of construction. These blocks are usually used to construct exterior or interior walls by superposing successive rows of blocks. To preserve the integrity of the constructed wall, a bonding material or fasteners are used to secure the successive rows to each other.

Corner blocks for joining two perpendicular walls have also been proposed.

The prior art hollow plastic blocks are not adapted for constructing ground borders in landscaping.

However, decorative blocks made of concrete are currently used in landscaping. Such concrete blocks are found in a plurality of shapes and sizes. Some of them are structured to be stacked in order to erect low walls, while others are designed to build borders between two different kinds of soils and/or grounds. For example, such blocks can serve to construct edging between a path and lawn.

A drawback of the prior art decorative blocks made of concrete is their important weight. These blocks are usually installed once and for all and any modification to their layout is troublesome since the lower portion of each block is embedded into the ground.

Another drawback of the prior art concrete blocks is the gap formed between each pair of successive blocks of a row, in particular when the blocks are laid to form a round corner. Indeed, when prior art concrete blocks are used to construct a border for delimiting an area in which plants are cultivated, soil from this area infiltrates the gaps between the successive blocks. This leads to an arrangement having a messy look.

Also, the successive concrete blocks are not fastened to each other whereby alignment of a row can be disturbed by lateral displacement of one or many blocks.

OBJECTS OF THE INVENTION

An object of the present invention is therefore to overcome the above discussed drawbacks of the prior art concrete blocks.

Another object of the invention is to provide a kit of blocks that can be assemble end to end without leaving any gap between the successive blocks.

A third object of the present invention is to provide a kit of hollow blocks using a mechanical piece for joining two successive blocks to each other.

A further object of the present invention is to provide a kit of hollow blocks made of light plastic material whereby the layout of the blocks on the ground can be easily changed.

A fifth object of the present invention is to provide a kit of blocks comprising a small number of different blocks enabling formation of layouts having an unlimited number of configurations.

SUMMARY OF THE INVENTION

More specifically, in accordance with the present invention, there is provided a kit of parts comprising blocks and interconnecting pieces to assemble the blocks end to end into a row, each block comprising two opposite end faces and each interconnecting piece comprising two opposite sides. The end faces of the blocks and the sides of the interconnecting pieces comprise respective mutually mating interconnecting elements extending transversely of the row and being slidable in each other upon transversal displacement of the interconnecting piece between the confronting end faces of a pair of consecutive blocks of the row, thus fastening the confronting end faces together.

The interconnecting pieces not only connect the successive blocks of the row to each other but also eliminate any gap between each pair of successive blocks, which interconnecting pieces are easily installed and removed by simple transversal displacement thereof to enable modification of the layout.

The blocks are advantageously hollow and made of plastic material.

Preferably, the end faces of each block define a predetermined acute angle $90°-\alpha$ with the geometrical axis of that block, and each interconnecting piece comprises a tapered border defining an angle $\beta=2\alpha$ to fit between the confronting end faces of a pair of consecutive blocks.

In accordance with another preferred embodiment of the kit according to the invention, the mating elements on the two opposite sides of the interconnecting pieces comprise right angle hooks each formed with a free end section extending transversely of the row, and the mating elements on the opposite end faces of the blocks comprise L-shaped apertures defining therein a rectangular projection extending transversely of the row and capable of being hooked by the right angle hooks.

In accordance with a further preferred embodiment of the kit according to the invention, the blocks comprise (a) at least one first elongate straight block having two opposite end faces each provided with at least one of the mating elements, (b) at least one second curved block having two opposite end faces each formed with at least one of the mating elements, and (c) at least one third block square in horizontal cross section and defining two pairs of opposite end faces each provided with at least one of the mating elements.

The objects, advantages and other features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 8 is an elevational view of the inner side of a cap plate of the kit of the invention, used to cover the end face of a block situated at an extremity of a row;

FIG. 9 is a cross sectional plan view of the cap plate of FIG. 8, taken along line 9—9 of FIG. 8;

FIG. 10 is a lateral elevational view of the cap plate of FIGS. 8 and 9;

FIG. 11 is a picket used to anchor the blocks to the ground;

DETAILED DESCRIPTION OF THE PREFERRED EMBODIMENT

The kit of hollow plastic blocks in accordance with the present invention comprises six different parts.

Figure 1:
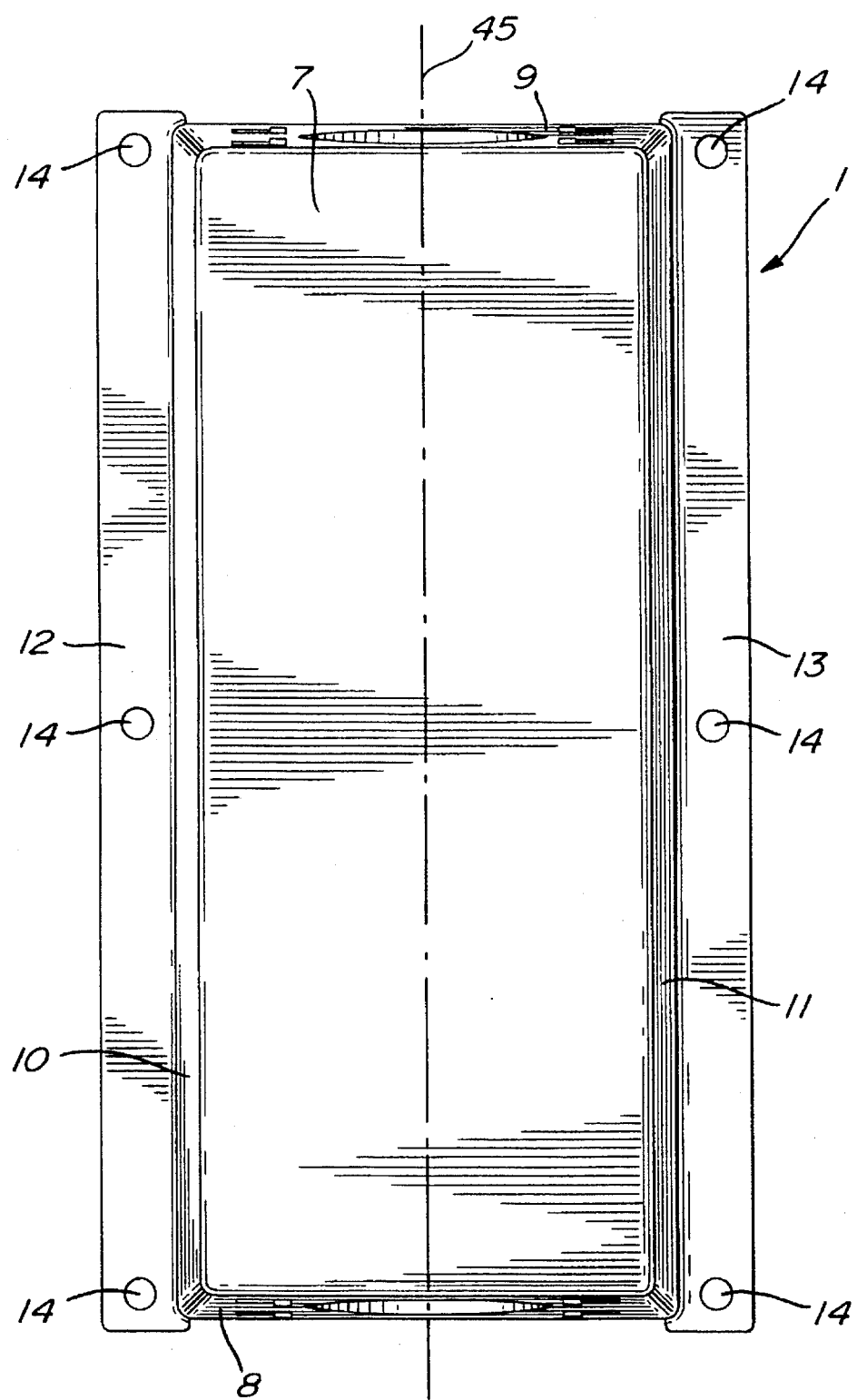
FIG. 1 is a top plan view of an elongated straight block of the kit in accordance with the present invention.
Figure 2:
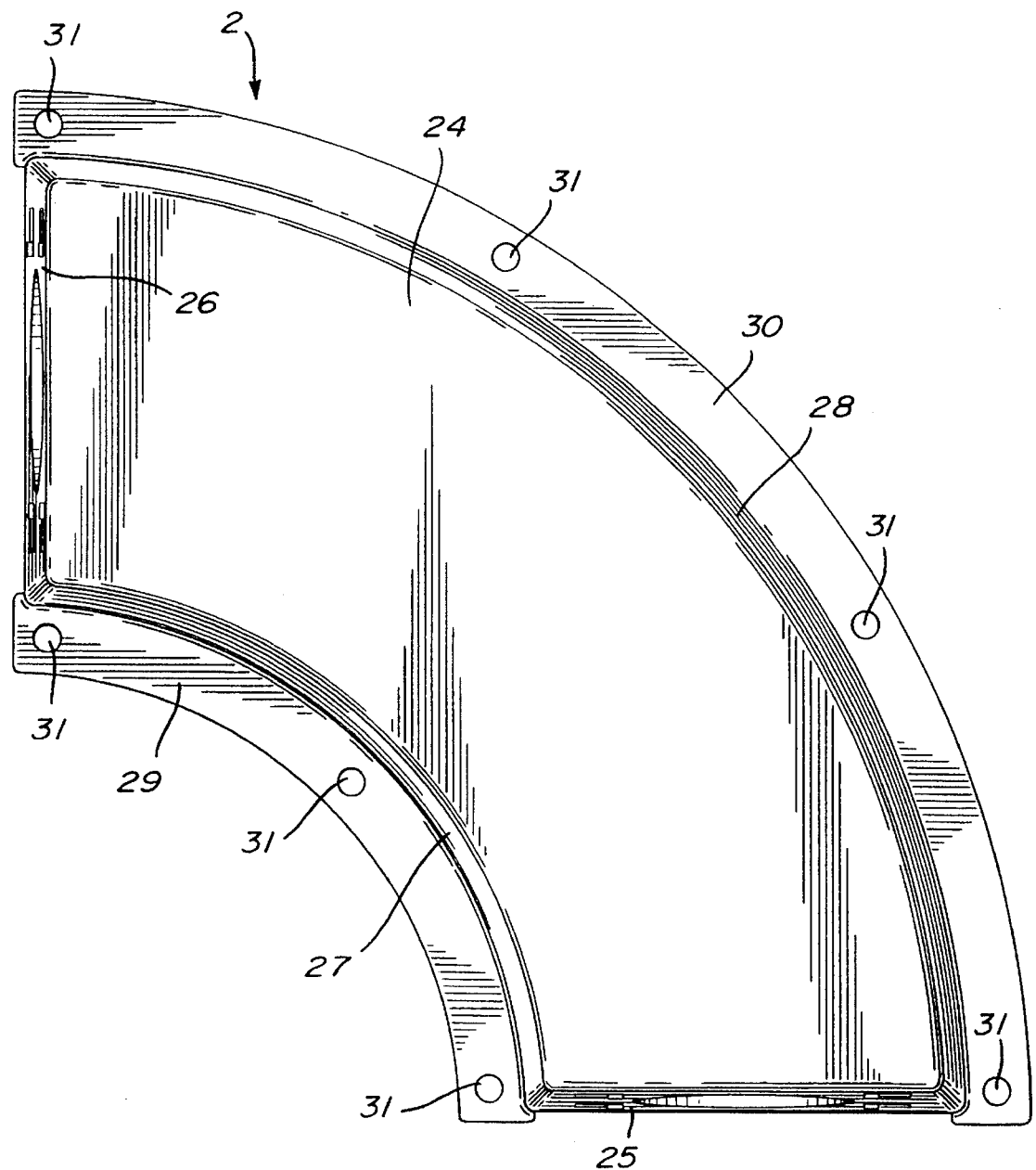
FIG. 2 is a top plan view of a round corner block of the kit in accordance with the present invention.
Figure 3:
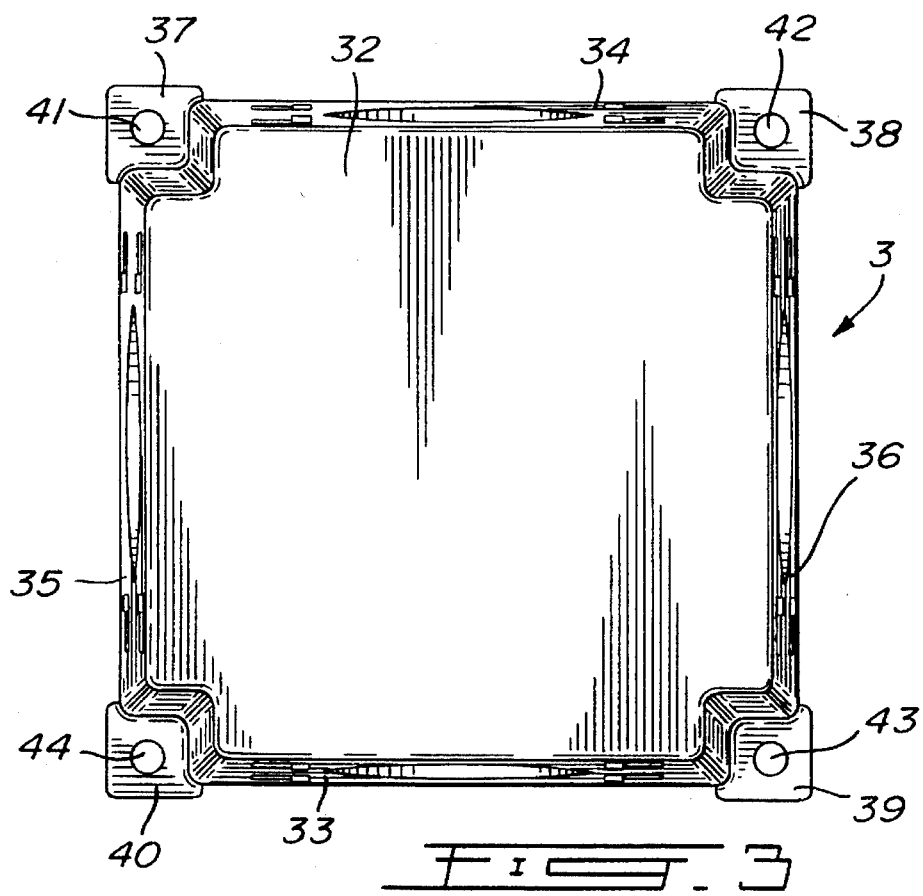
FIG. 3 is a top plan view of a square corner block of the kit in accordance with the present invention.

Referring to FIGS. 1, 2 and 3 of the appended drawings, the kit first comprises three types of blocks: an elongate straight block 1, a round corner block 2 and a square corner block 3. The blocks 1-3 are hollow and are formed of a top wall and of four generally vertical walls. Their bottom is open.

As mentioned in the foregoing description, the blocks 1-3 are made of plastic material. Good results have been obtained with synthetic resin. It is also possible to mix some mineral substances to obtain a granite look. The thickness of the walls of the hollow blocks 1-3 is not critical as long as it is selected to offer not only lightness but also rigidity and solidity to the blocks.

Figure 5:
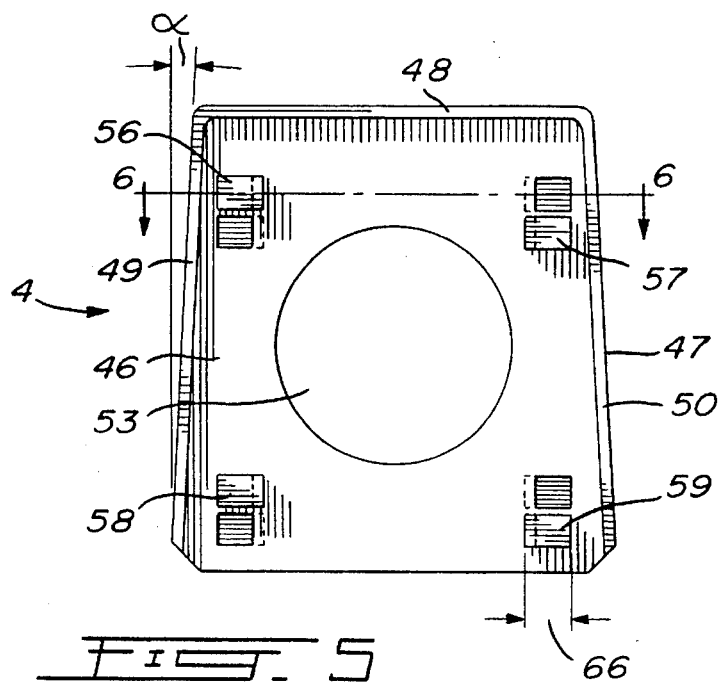
FIG. 5 is a front elevational view of one side of an interconnecting piece of the kit of the invention, for assembling the successive blocks end to end.
Figure 6:
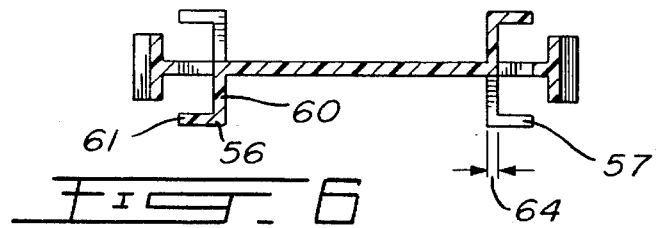
FIG. 6 is cross sectional plan view of the interconnecting piece of FIG. 5, taken along line 6—6 of FIG. 5.
Figure 7:
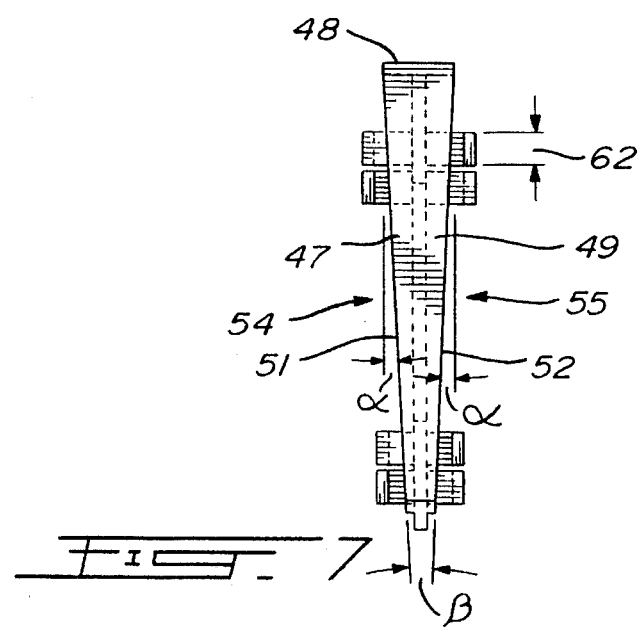
FIG. 7 is a lateral elevational view of the interconnecting piece of FIGS. 5 and 6.

The kit also comprises an interconnecting piece 4 as illustrated in FIGS. 5-7, and a picket 5, preferably metallic, as illustrated in FIG. 11.

The last part of the kit is a cap plate 6, illustrated in FIGS. 8-10, to be mounted on a free end face of a block situated at the extremity of a row.

The interconnecting piece 4 and the cap plate 6 are made of the same plastic material as the hollow blocks 1-3.

Figure 12:
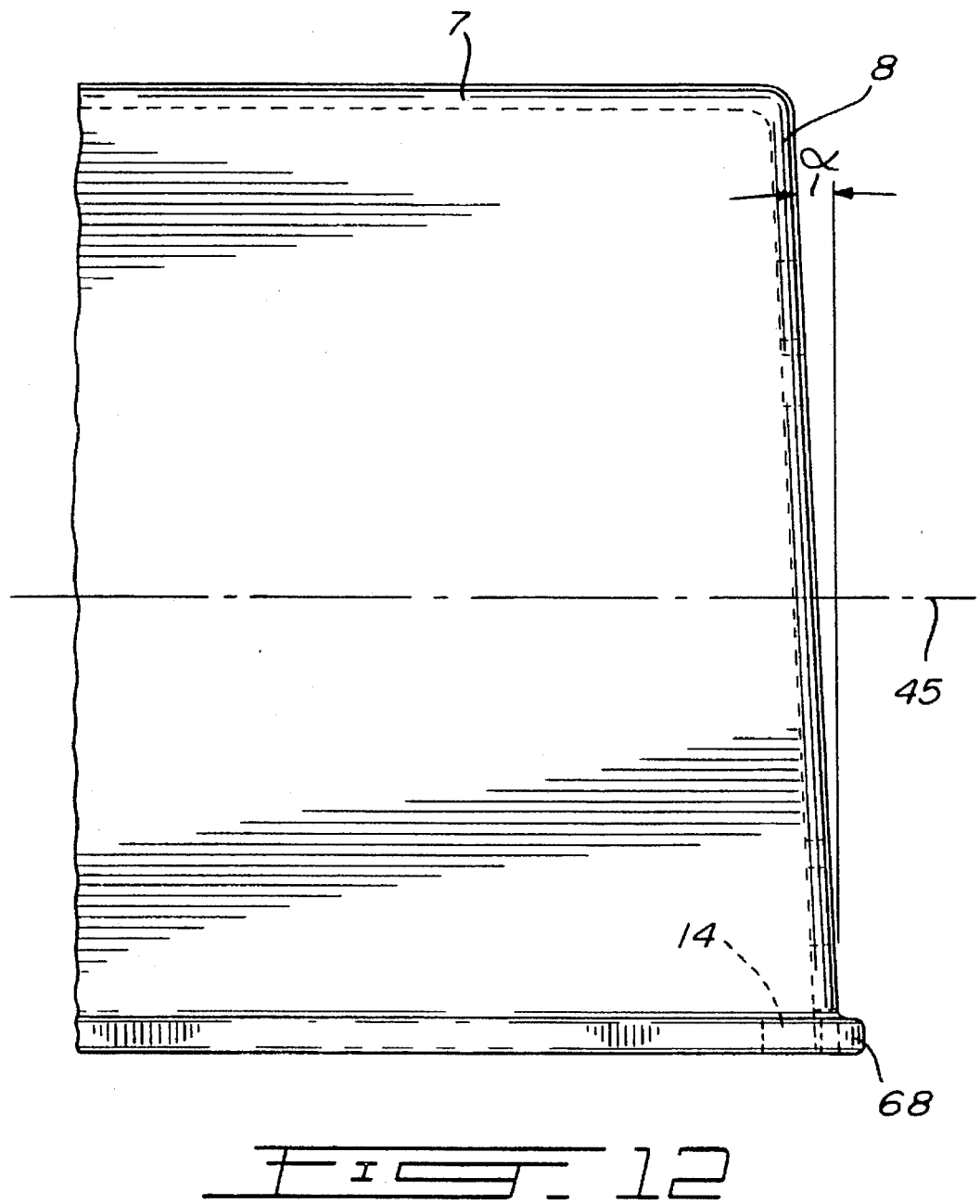
FIG. 12 is a lateral elevational view of the ends of the blocks of FIGS. 1 to 3.

The elongate straight block 1 will now be described with reference to FIGS. 1, 4 and 12.

Figure 4:
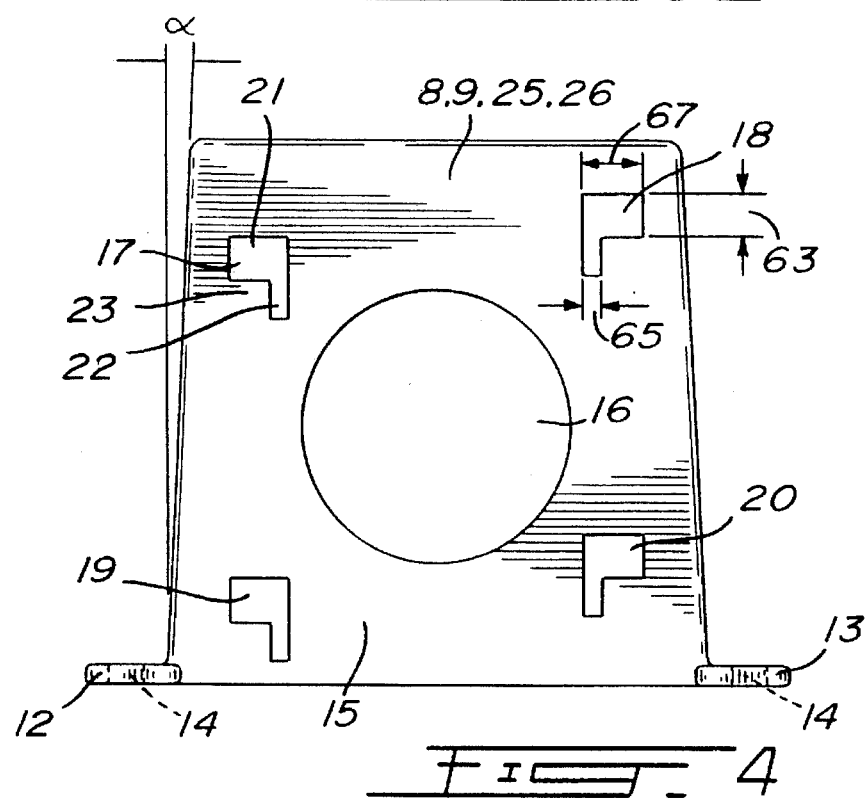
FIG. 4 is a front elevational view of the end faces of the blocks of FIGS. 1 to 3.

Block 1 is a one piece hollow plastic block comprising a top wall 7 and four generally vertical walls 8, 9, 10 and 11 of which the two lateral walls 10 and 11 are slightly inclined with respect to the vertical by and angle $\alpha$ (FIG. 4). The end walls 8 and 9 of block 1 therefore define an acute angle 90°$-\alpha$ with the longitudinal axis 45 of that block (see FIG. 12).

The bottoms of walls 10 and 11 are formed with respective horizontal outwardly extending flanges 12 and 13 provided with holes 14 therein. The function of the holes 14 is to fasten the elongate straight block 1 to the ground by driving pickets 5 (FIG. 11) into the ground through these holes 14 after laying out of the blocks is completed. The outward flanges 12 and 13 also increase the stability of the blocks 1 by increasing the surface of contact between each block 1 and the ground.

The end walls 8 and 9 of the elongate straight block 1 define respective identical end faces such as 15 in FIG. 4. As illustrated in FIG. 4, the end face 15 comprises a central circular opening 16 to lighten block 1 and enable the installation of pipes or wires through a border made with elongate blocks 1.

The end face 15 also comprises four L-shaped apertures 17, 18, 19 and 20. Each L-shaped apertures 17-20 comprises a horizontal portion 21 and a vertical portion 22. As shown in FIG. 4, aperture 17 is opposite to aperture 18 and slightly lower than that aperture 18. In the same manner, aperture 19 is opposite to aperture 20 and slightly lower than that aperture 20.

As illustrated in FIG. 4, each L-shaped aperture 17-20 defines therein a rectangular projection 23 extending transversely of the longitudinal axis 45 of the block 1, and whose purpose will be described hereinafter.

The fact that elongate block 1 has no bottom, combined with the angle $\alpha$ of inclination of the four walls 8-11 enable compact stacking of blocks 1 during transport.

Referring now to FIG. 2, the round corner block 2 is illustrated.

Corner block 2 is a one piece hollow plastic block comprising a round top wall 24, two opposite end walls 25 and 26, and two arcuate lateral walls 27 and 28. Again, the walls 25-28 are slightly inclined with respect to the vertical by the angle $\alpha$ as described in the foregoing description with reference to walls 8-11 of block 1.

The bottoms of lateral walls 27 and 28 are formed with respective horizontal outwardly extending arcuate flanges 29 and 30 provided with holes 31 therein. The function of the holes 31 is to fasten the round corner block 2 to the ground by driving pickets 5 (FIG. 11) into the ground through these holes 31 after laying out of the blocks is completed. The outward flanges 29 and 30 also increase the stability of the blocks 2 by increasing the surface of contact between each block 2 and the ground.

The end walls 25 and 26 define respective opposite end faces of the block 2 identical to face 15 of FIG. 4 described hereinabove with reference to elongate straight block 1.

Referring to FIG. 3 of the appended drawings, corner block 3 is square in horizontal cross section.

Corner block 3 is a one piece hollow plastic block comprising a square top wall 32, a first pair of opposite end walls 33 and 34, and a second pair of opposite end walls 35 and 36. The walls 33-36 are still slightly inclined with respect to the vertical by the angle $\alpha$ as described in the foregoing description with reference to walls 8-11 of block 1.

The bottoms of walls 33-36 are formed with horizontal outwardly extending corner tabs 37-40 having respective holes 41-44 therein. The function of the holes 41-44 is to fasten the corner block 3 to the ground by driving pickets 5 (FIG. 11) into the ground through these holes 41-44. The tabs 37-40 also increase the surface of contact between each block 3 and the ground to thereby increase the stability of the blocks 3 on the ground.

The end walls 33 and 34 define a first pair of opposite end faces of the block 3 identical to face 15 of FIG. 4 described hereinabove with reference to elongate straight block 1. In the same manner, the end walls 35 and 36 define a second pair of opposite end faces of the block 3 identical to face 15 of FIG. 4.

The interconnecting piece 4 for assembling the various blocks of the kit end to end into a row will be described with reference to FIGS. 5–7.

As illustrated in FIG. 5, the interconnecting piece 4 includes a flat central portion 46 surrounded by a border 47. Border 47 defines a top section 48 of constant width, and two downwardly tapering lateral sections 49 and 50. Each side 51 and 52 of each border section 49 and 50 defines with the vertical the angle α whereby the angle of tapering of the border sections 49 and 50 is equal to β=2α.

A central hole 53 is made through the flat portion 46 of the interconnecting piece to lighten piece 4 and enable passage of electric wire and/or piping.

Accordingly, the interconnecting piece 4 is formed with two opposite identical sides 54 and 55. Each side 54 and 55 comprises on the central portion 46 four right angle hooks 56-59. Each hook 56-59 comprises a stem such as 60 connected to central portion 46 and a free end section such as 61 extending from the stem 60 horizontally and toward the adjacent lateral border section 49 or 50. Therefore, as will be seen in the following description, the free end section 61 of each hook 56-59 extends transversely of the row of blocks.

Hook 57 is slightly lower than hook 56, while hook 59 is slightly lower than hook 58 to enable these right angle hooks to fit into the apertures 17-20, respectively, as described hereinafter. For that purpose, the vertical dimension 62 (FIG. 7) of each hook 56-59 is slightly smaller than the vertical dimension 63 (FIG. 4) of the horizontal portion 21 of the L-shaped apertures 17-20 of the end faces of blocks 1-3. Also, the width 64 (FIG. 6) of the stem 60 of each hook 56-59 is slightly narrower than the width 65 (FIG. 4) of the vertical portion 22 of the L-shaped apertures 17-20. Moreover, the length 66 (FIG. 5) of the horizontal free end section 61 of each hook 56-59 is slightly shorter than the length 67 (FIG. 4) of the horizontal portion 21 of the L-shaped apertures 17-20 but is substantially greater than width 65 (FIG. 4) of the vertical portion 21 of the said apertures 17-20.

To build a border or the like, blocks 1-3 are placed end to end to form a row in which each pair of successive blocks have respective confronting end surfaces. To assemble the blocks 1-3 of the row with each other, an interconnecting piece 4 is slid downwardly in the V-shaped gap existing between the two confronting end faces of each pair of successive blocks. The right angle hooks 56-59 of the two sides 54 and 55 of the interconnecting piece 4 then penetrate simultaneously in the L-shaped apertures 17-20 of the corresponding end faces of the blocks. More specifically, downward displacement of the interconnecting piece 4 causes the free end sections 61 of the hooks 56-59 to penetrate simultaneously in the horizontal portions 21 of the apertures 17-20 and then the stems 60 of the hooks 56-59 to penetrate the vertical portions 22 of the apertures 17-20 until the free end sections 61 of the hooks 56-59 are positioned behind the rectangular projections 23 of the apertures 17-20, respectively, to thereby fasten the end faces of the blocks to the interconnecting piece. Inclination of the end faces of the blocks enable easy penetration of the hooks in the apertures. Also, the bottom of the end walls 8, 9, 25, 26 and 33-36 is provided with a narrow external flange 68 (FIG. 12). When the narrow flanges 68 of the two confronting end faces of a pair of consecutive blocks of a row abut against each other, these two confronting end faces are automatically and appropriately spaced apart from each other to enable insertion of an interconnecting piece 4. The resulting assembly is linear since the angle β=2α of tapering of the border section 49 and 50 corresponds to the angle 2α of the V-shaped gap between the two successive blocks of the row.

It should be pointed out here that the length of the stems 60 of the hooks 56-59 are adjusted to allow the free end sections 61 of these hooks to be positioned behind the rectangular projections 23 of the apertures 17-20, taking into consideration the varying width of the border 47.

Subsequent upward displacement of an interconnecting piece 4 assembling two blocks of a row end to end will dislodge the hooks 56-59 from the apertures 17-20 to thereby disassemble the two successive blocks.

The cap plate 6 will now be described with reference to FIGS. 8–10.

The cap plate 6 comprises on one side thereof four right angle hooks 69-72 similar to the hooks 56-59 of each side 54 and 55 of the interconnecting piece 4, to thereby fit in the apertures 17-20 of the end faces formed by the walls 8, 9, 25, 26 and 33-36. Therefore, the cap plate 6 can be installed on any end face of the blocks of the kit by introducing the right angle hooks 69-72 in the apertures 17-20 of that end face. More specifically, the free end sections 73 of the hooks 69-72 are first inserted in the horizontal portions 21 of the apertures 17-20 and then, the cap plate 6 is moved downwardly to insert the stems 74 of the hooks 69-72 until the free end sections 73 are positioned behind the rectangular projection 23 of the apertures and thereby fasten the cap plate 6 to the end face of the corresponding block.

After layout of the blocks is completed, the blocks can be anchored by means of pickets 5 driven into the ground through the holes 14, 31 and 41-44.

Figure 13:
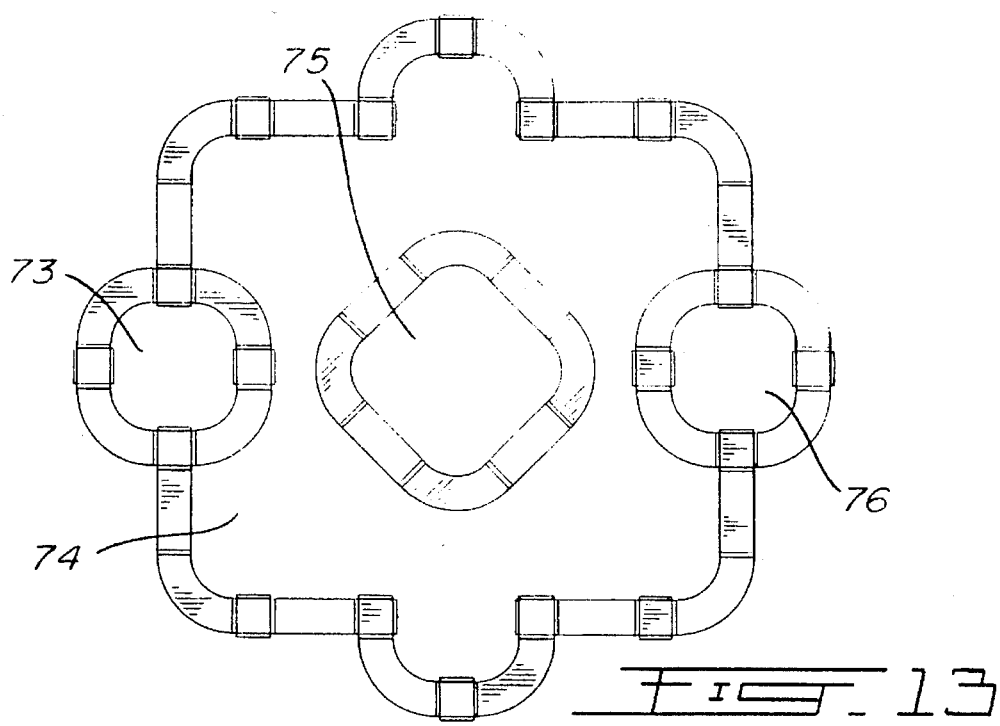
FIG. 13 is a top plan view of a first layout of blocks of the kit in accordance with the invention, forming borders to delimit areas for cultivating flowers and/or other plants.

FIG. 13 illustrates a plant cultivating area constructed with the kit in accordance with the present invention. The following steps have been carried out to construct this area:

a plurality of blocks 1, 2 and 3 have been placed on the ground to achieve the desired configuration;

an interconnecting piece 4 have been inserted between the confronting end faces of each pair of consecutive blocks of a row following the method described hereinabove;

a cap plate 6 has been placed on each exposed end face; and pickets 5 (not shown) have been inserted in the holes 14, 31 and 41-44 and driven into the ground to thereby anchor the blocks 1-3 to the ground.

The area of FIG. 13 defines subareas 73-76 that have been filled with soil, in which flowers and/or plants have been seeded.

Figure 14:
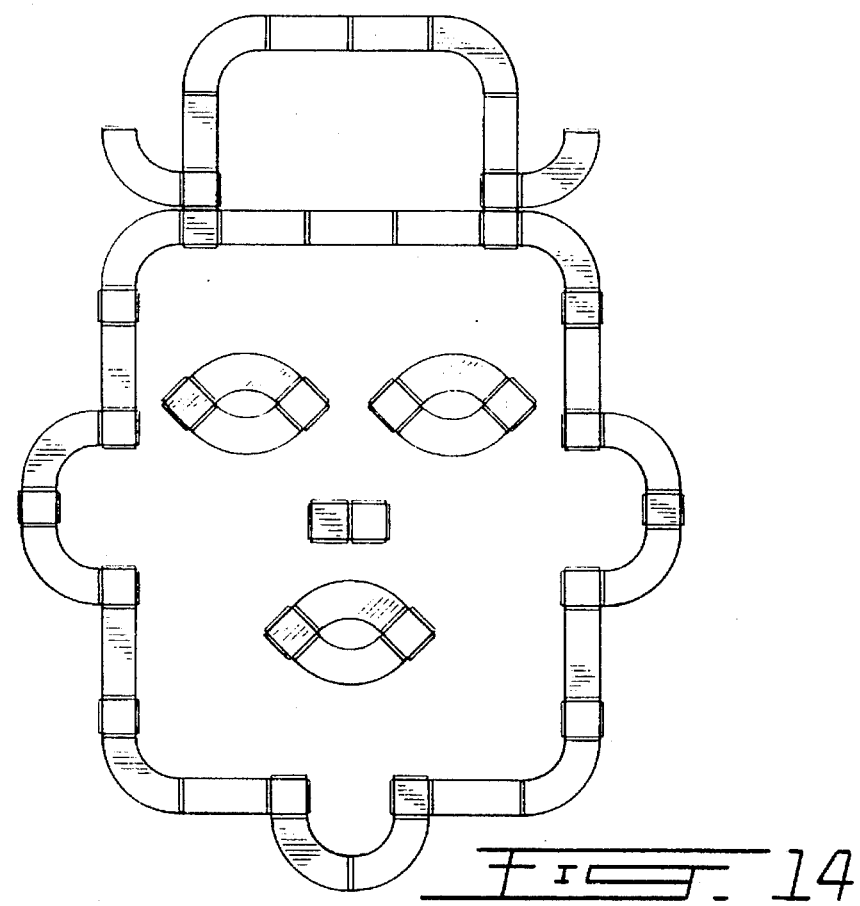
FIG. 14 is a top plan view of a second layout of blocks of the kit according to the invention, illustrating a face.

The kit of the present invention can also be used as a giant puzzle for children. This application is illustrated in FIG. 14 showing a man's face drawn on the ground with the blocks of the kit according to the present invention. To construct the face of FIG. 14, the same steps as described above with reference to FIG. 13 are carried out; however, since the installation is not permanent, pickets 5 are not used.

The following are other possible applications of the kit of the invention:

ground decoration;

structure for containing sand (sand box);

letters or numbers made on the ground;

curb to delimit a path or playing area; and bird nesting areas.

Although the present invention has been described hereinabove by way of a preferred embodiment thereof, this embodiment can be modified at will, within the scope of the appended claims, without departing from the spirit and nature of the subject invention.

What is claimed is:

1. A kit of parts comprising blocks and interconnecting pieces to assemble said blocks end to end into a row, each block comprising two opposite end faces and each interconnecting piece comprising two opposite sides, said end faces of the blocks and said sides of the interconnecting pieces comprising respective mutually mating interconnecting elements, wherein the interconnecting elements of one of said interconnecting pieces mate with the interconnecting elements of the confronting end faces of each pair of consecutive blocks of said row to thereby fasten said confronting end faces together, wherein (a) each block has a longitudinal axis, (b) the end faces of each block define a predetermine acute angle $90°-\alpha$ with the longitudinal axis of said block, and (c) each interconnecting piece is flat and comprises a tapered border defining an angle $\beta=2\alpha$ to fit between the confronting end faces of a pair of consecutive blocks of the row.

2. A kit of parts as described in claim 1, further comprising at least one cap plate member having one side provided with interconnecting elements, said interconnecting elements of the cap plate member and said interconnecting elements of each opposite end face of the blocks mutually mating each other to mount said cap plate member on one of said end faces of the blocks.

3. A kit of parts as described in claim 1, wherein said blocks are hollow and made of plastic material.

4. A kit of parts comprising blocks and interconnecting pieces to assemble said blocks end to end into a row, each block comprising two opposite end faces and each interconnecting piece comprising two opposite sides, said end faces of the blocks and said sides of the interconnecting pieces being provided with respective mutually mating interconnecting elements comprising hook members on said faces or sides and apertures on said sides or faces, respectively, said hook members being structured to slide in the apertures upon transversal displacement of one of said interconnecting pieces between the confronting end faces of a pair of consecutive blocks of said row to thereby fasten said confronting end faces together.

5. A kit of parts as described in claim 4, wherein said hook members comprise right angle hooks, and wherein said apertures are L-shaped to define therein respective rectangular projections to be hooked by said right angle hooks.

6. A kit of parts comprising blocks and interconnecting pieces to assemble said blocks end to end into a row, each block comprising two opposite end faces and each interconnecting piece comprising two opposite sides, said end faces of the blocks and said sides of the interconnecting pieces comprising repective mutually mating interconnecting elements, wherein the interconnecting elements of one of said interconnecting pieces mate with the interconnecting elements of the confronting end faces of each pair of consecutive blocks of said row to thereby fasten said confronting end faces together, wherein said blocks comprise (a) at least one first elongate straight block having two opposite end faces each provided with at least one of said interconnecting elements, (b) at least one second curved block having two opposite end faces each formed with at least one of said interconnecting elements, and (c) at least one third block square in horizontal cross section and defining two pairs of opposite end faces each provided with at least one of said interconnecting elements.

7. A kit of parts as described in claim 6, wherein said blocks are hollow, and wherein said mutually mating interconnecting elements comprise (a) right angle hooks formed on the opposite sides of each interconnecting piece, and (b) L-shaped apertures formed on said opposite end faces of the first, second and third blocks and defining therein respective rectangular projections to be hooked by said right angle hooks.

8. A kit of parts as described in claim 7, further comprising at least one cap plate member comprising one side provided with right angle hooks structured to be hooked to the rectangular projections of the L-shaped apertures formed on the opposite end faces of the first, second and third blocks.

* * * * *